United States Patent
Laddu

(10) Patent No.: US 12,557,080 B2
(45) Date of Patent: Feb. 17, 2026

(54) IAB SOFT RESOURCE AVAILABILITY INDICATION WITH M-TRP FRAMEWORK

(71) Applicant: Nokia Solutions and Networks Oy, Espoo (FI)

(72) Inventor: Keeth Saliya Jayasinghe Laddu, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 364 days.

(21) Appl. No.: 18/247,989

(22) PCT Filed: Oct. 4, 2021

(86) PCT No.: PCT/EP2021/077240
§ 371 (c)(1),
(2) Date: Apr. 5, 2023

(87) PCT Pub. No.: WO2022/078793
PCT Pub. Date: Apr. 21, 2022

(65) Prior Publication Data
US 2023/0379220 A1    Nov. 23, 2023

Related U.S. Application Data

(60) Provisional application No. 63/090,462, filed on Oct. 12, 2020.

(51) Int. Cl.
*H04W 72/23* (2023.01)
*H04L 43/0805* (2022.01)
*H04W 72/0446* (2023.01)

(52) U.S. Cl.
CPC ..... *H04W 72/0446* (2013.01); *H04L 43/0805* (2013.01)

(58) Field of Classification Search
CPC .......... H04B 7/15542; H04L 43/0805; H04W 72/0446
See application file for complete search history.

(56) References Cited

U.S. PATENT DOCUMENTS

2020/0145991 A1    5/2020  Abedini et al.
2022/0060277 A1*   2/2022  Wei ........................ H04L 1/0007
(Continued)

FOREIGN PATENT DOCUMENTS

EP       3651526 A1    5/2020
WO    2020/144398 A1    7/2020
(Continued)

OTHER PUBLICATIONS

"Summary #1 of [102-e-NR-elAB-01]", 3GPP TSG RAN WG1 #102-e, R1-2007241, Agenda: 8.10.1, AT&T, Aug. 17-28, 2020, 25 pages.
(Continued)

*Primary Examiner* — Phuc H Tran
(74) *Attorney, Agent, or Firm* — Lippes Mathias LLP

(57) ABSTRACT

In accordance with example embodiments of the disclosure there is at least a method and apparatus to perform receiving from a network node, by a network device of a communication network, information including a configuration for monitoring an indication of soft symbol availability from a communication network that uses at least one parent node to support the network device; based on the configuration, determining by the network device to monitor the indication of soft symbol availability from the at least one parent,
(Continued)

wherein the determining is based on the indication of soft symbol availability being from one parent or more than one parent of the at least one parent; and based on the determining, performing measures by the network device before applying indicated changes for a usage of the soft symbol at the network device. Further, to perform determining, by a network node of a communication network, information for a network device including a configuration for monitoring an indication of soft symbol availability from a communication network that uses at least one parent node to support the network device; and based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent.

20 Claims, 8 Drawing Sheets

(56) References Cited

U.S. PATENT DOCUMENTS

| | | | | |
|---|---|---|---|---|
| 2022/0182977 | A1* | 6/2022 | Miao | H04W 72/0446 |
| 2023/0180248 | A1* | 6/2023 | Shim | H04L 5/001 |
| 2024/0422772 | A1* | 12/2024 | MolavianJazi | H04W 72/1263 |

FOREIGN PATENT DOCUMENTS

| | | |
|---|---|---|
| WO | 2020/146507 A1 | 7/2020 |
| WO | 2020/169185 A1 | 8/2020 |
| WO | 2020/169206 A1 | 8/2020 |
| WO | 2020/197563 A1 | 10/2020 |

OTHER PUBLICATIONS

"3rd Generation Partnership Project; Technical Specification Group Radio Access Network; NR; Physical layer procedures for control (Release 16)", 3GPP TS 38.213, V16.2.0, Jun. 2020, pp. 1-176.

"3rd Generation Partnership Project; Technical Specification Group Radio Access Network; NR; Physical layer procedures for data (Release 16)", 3GPP TS 38.214, V16.2.0, Jun. 2020, pp. 1-163.

"Resource Management in IAB Network", 3GPP TSG RAN WG1 Meeting #95, R1-1813419, Agenda: 7.2.3.3, Qualcomm Incorporated, Nov. 12-16, 2018, 8 pages.

"TP for 38.874 on PHY Enhancements for NR IAB", 3GPP TSG RAN WG1 Meeting #95, R1-1814190, Agenda: 7.2.3, AT&T, Nov. 12-16, 2018, 21 pages.

International Search Report and Written Opinion received for corresponding Patent Cooperation Treaty Application No. PCT/EP2021/077240, dated Jan. 21, 2022, 16 pages.

"Mechanisms for resource multiplexing among backhaul and access links", 3GPP TSG RAN WG1 #96bis, 7 R1-1904642, Agenda: 7.2.3.3, Nokia, Apr. 8-12, 2019, 16 pages.

Office Action received for corresponding European Patent Application No. 21786880.1, dated Jun. 5, 2024, 5 pages.

* cited by examiner

| IAB-DC soft symbol availability in a slot (considering different combinations) | Value/DCI 2-5 from TRP2 | | | | | | | |
|---|---|---|---|---|---|---|---|---|
| | 0 | 1 | 2 | 3 | 4 | 5 | 6 | 7 |
| Value/DCI 2-5 from TRP1 — 0 | No indication | No indication | No indication | No indication | No indication | No indication | No indication | No indication |
| 1 | No indication | DL-S: Yes UL-S: No F-S: No | No indication | DL-S: Yes UL-S: No F-S: No | No indication | DL-S: Yes UL-S: No F-S: No | No indication | DL-S: Yes UL-S: No F-S: No |
| 2 | No indication | No indication | DL-S: No UL-S: Yes F-S: No | DL-S: No UL-S: Yes F-S: No | No indication | No indication | DL-S: No UL-S: Yes F-S: No | DL-S: No UL-S: Yes F-S: No |
| 3 | No indication | DL-S: Yes UL-S: No F-S: No | DL-S: No UL-S: Yes F-S: No | DL-S: Yes UL-S: Yes F-S: No | No indication | DL-S: Yes UL-S: No F-S: No | DL-S: No UL-S: Yes F-S: No | DL-S: Yes UL-S: Yes F-S: No |
| 4 | No indication | No indication | No indication | No indication | DL-S: No UL-S: No F-S: Yes | DL-S: No UL-S: No F-S: Yes | DL-S: No UL-S: No F-S: Yes | DL-S: No UL-S: No F-S: Yes |
| 5 | No indication | DL-S: Yes UL-S: No F-S: No | DL-S: No UL-S: Yes F-S: No | DL-S: Yes UL-S: Yes F-S: No | DL-S: No UL-S: No F-S: Yes | DL-S: Yes UL-S: No F-S: Yes | DL-S: No UL-S: Yes F-S: Yes | DL-S: Yes UL-S: No F-S: Yes |
| 6 | No indication | DL-S: Yes UL-S: No F-S: No | DL-S: No UL-S: Yes F-S: No | DL-S: Yes UL-S: Yes F-S: No | DL-S: No UL-S: No F-S: Yes | DL-S: Yes UL-S: No F-S: Yes | DL-S: No UL-S: Yes F-S: Yes | DL-S: Yes UL-S: Yes F-S: Yes |
| 7 | No indication | DL-S: Yes UL-S: No F-S: No | DL-S: No UL-S: Yes F-S: No | DL-S: Yes UL-S: Yes F-S: No | DL-S: No UL-S: No F-S: Yes | DL-S: Yes UL-S: No F-S: Yes | DL-S: No UL-S: Yes F-S: Yes | DL-S: Yes UL-S: Yes F-S: Yes |

FIG. 3

| Value | Indication |
|---|---|
| 0 | No indication of availability for soft symbols |
| 1 | DL soft symbols are indicated available<br>No indication of availability for UL and Flexible soft symbols |
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL and Flexible soft symbols are indicated available |

FIG. 4

550: determining, by a network node of a communication network, information for a network device comprising a configuration for monitoring an indication of soft symbol availability from a communication network that uses at least one parent node to support the network device 560: based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent

FIG. 5B

IAB SOFT RESOURCE AVAILABILITY INDICATION WITH M-TRP FRAMEWORK

RELATED APPLICATION

This application claims priority to PCT Application No. PCT/EP2021/077240, filed on Oct. 4, 2021, which claims priority to U.S. Provisional Application No. 63/090,462, filed on Oct. 12, 2020, each of which is incorporated herein by reference in its entirety.

TECHNICAL FIELD

The teachings in accordance with the exemplary embodiments of this disclosure relate generally to a novel method for an IAB-MT that operates in multi-DCI based multi-TRP operation and, more specifically, relate to a novel method for an IAB-MT that operates in multi-DCI based multi-TRP operation, such as where a soft resource availability indication at the IAB DU is applied based on novel approaches.

BACKGROUND

This section is intended to provide a background or context to the disclosure that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AI Availability Indicator
CORESET Control Resource Set
D downlink
DCI Downlink Control Information
DL Downlink
DU Distributed Unit
F Flexible
H Hard
IAB Integrated Access and Backhaul
IAB-MT Integrated Access and Backhaul Mobile Termination
Multi-TRP More than one Transmission Reception Point
MT Mobile Termination
NA Not Available
RNTI Radio Network Temporary Identifier
S Soft
TRP Transmission Reception Point
U Uplink
UE User equipment The Media Access Control (MAC) data communication protocol sublayer, also known as the Medium Access Control, is a sublayer of the Data Link Layer specified in the seven-layer OSI model (layer 2), and in the four-layer TCP/IP model (layer 1). It provides addressing and channel access control mechanisms that make it possible for several terminals or network nodes to communicate within a multiple access network that incorporates a shared medium, e.g. Ethernet. The hardware that implements the MAC is referred to as a Medium Access Controller.

Wireless communication systems are widely deployed and provide various types of communication content such as voice, video, packet data, messaging, broadcast, and so on. Such wireless communication systems can be capable of supporting communication with multiple users by sharing the available system resources (e.g., time, frequency, and power). A wireless communication system can include a number of base stations or network access nodes, each simultaneously supporting communication for multiple communication devices, which may be otherwise known as user equipment (UE).

In order to support such communications these wireless communication systems can communicate with UEs using one TRP corresponding to a same base station, or using multiple TRPs corresponding to multiple base stations. In cases where the network uses multiple TRPs to communicate with the UE, whether at the same base station or different base stations, the network may use a number of different multi-TRP configurations for the communications with the UE.

Example embodiments of this disclosure work to improve at least these operations.

SUMMARY

In an example aspect of the disclosure, there is an apparatus, such as a network device or user side apparatus, comprising: at least one processor; and at least one memory including computer program code, where the at least one memory and the computer program code are configured, with the at least one processor, to cause the apparatus to at least: receive from a network node, by a network device of a communication network, information comprising a configuration for monitoring an indication of soft symbol availability from a communication network that uses at least one parent node to support the network device; based on the configuration, determine by the network device to monitor the indication of soft symbol availability from the at least one parent, wherein the determining is based on the indication of soft symbol availability being from one parent or more than one parent of the at least one parent; and based on the determining, perform measures by the network device before applying indicated changes for a usage of the soft symbol at the network device.

In another example aspect of the disclosure, there is a method comprising: receiving from a network node, by a network device of a communication network, information comprising a configuration for monitoring an indication of soft symbol availability from a communication network that uses at least one parent node to support the network device; based on the configuration, determining by the network device to monitor the indication of soft symbol availability from the at least one parent, wherein the determining is based on the indication of soft symbol availability being from one parent or more than one parent of the at least one parent; and based on the determining, performing measures by the network device before applying indicated changes for a usage of the soft symbol at the network device.

A further example embodiment is a method and apparatus comprising the method and apparatus of the previous paragraphs, wherein the measures comprise conflict resolution measures when the soft symbol availability is based on different soft symbol availability indications for more than one parent of the at least one parent, wherein a configuration for monitoring the indication of soft symbol availability is linked to search spaces that downlink control information format indicates for the soft symbol availability, wherein based on the network node being capable of conflict resolution measures, the network device does not expect any conflicting soft symbol availability indication to be received within a same slot from the downlink control information format, wherein the more than one parent comprise more than one transmission-reception point with more than one control resource set divided among different transmission reception points using control resource set pool index value, wherein the information comprises an indication of soft symbol availability from different transmission-reception points of the more than one transmission-reception point, wherein the indication of soft symbol availability from the different transmission-reception points are dynamically coordinated to be the same, wherein the soft symbol availability is indicated independently by each transmission-reception point of the different transmission-reception points, wherein indications of the soft symbol availability indicated using the downlink control information format comprises one of same indications or different indications received via the different transmission-reception points, wherein when different indications received, the conflict resolution measures consider a rule that a given resource type is only available only if both parents provides soft symbol availability indications that allows to use a soft symbol at the network device, wherein the given resource type comprises at least one of downlink, uplink, or flexible resources at the distributed unit of the network device, and the availability of soft resources for each resource type follows a same principal, wherein when different indications received, the conflict resolution measures consider a rule that a given resource type is available if at least one parent provides availability indicator, while a different resource type is not available unless both parents provides availability indicator, wherein for a case the indication of soft symbol availability is from just one transmission-reception point, there is: the network device determining not to use this soft symbol availability for the applying for a given resource type of all resource types, wherein the indication of soft symbol availability from the different transmission-reception points are dynamically pre-configured for the network device, wherein the dividing comprises search spaces that DCI format indicating the soft resource availability are associated with more than one transmission-reception point, wherein the measures for a soft symbol availability indication that is for one parent, comprises: using a pre-defined time offset prior to applying soft symbol availability indication based on the soft symbol availability indication by the one parent, wherein the pre-defined time offset is received via the different transmission-reception points, wherein based on receiving downlink control information format from a first transmission-reception point, the method comprising: during the pre-defined time offset, the network device is only required to send uplink transmissions towards to a second transmission-reception point, wherein a pre-defined time offset is defined for indication of the downlink control information format, wherein pre-defined time offset period is one of: interpreted to the network device by using first set of slot are indicated as not available using a value 0, or defined for indication value of the downlink control format, and wherein if all resources are indicated available using a value 7, then the pre-defined time period could be an X number of slots, or wherein if no resources are indicated as available using a value 0 a lower offset or 0 slots may be defined, wherein if all resources are indicated as available, then the predefined time period comprises X slots, where X is an integer, wherein if zero resources are indicated as available, then a lower offset of 0 slots is defined, wherein a configuration for monitoring the indication of soft symbol availability is linked to a search space associated with one transmission-reception point that downlink control information format indicates for the soft symbol availability, and wherein the indication of soft symbol availability being from one parent or more than one parent is determined based on a search space association towards at least one control resource set and a use at each parent of the at least one control resource set, wherein the indication of soft symbol availability applies for any combinations of downlink, uplink, and Flexible soft resource availabilities.

A non-transitory computer-readable medium (MEM 12B of FIG. 2) storing program code (PROG 10C of FIG. 2), the program code executed by at least one processor (DP 10A of FIG. 2) to perform the operations as at least described in the paragraphs above.

In accordance with an example embodiment of the disclosure as described above there is an apparatus comprising: means for receiving from a network node, by a network device of a communication network, information comprising a configuration for monitoring an indication of soft symbol availability from a communication network that uses at least one parent node to support the network device; means, based on the configuration, for determining by the network device to monitor the indication of soft symbol availability from the at least one parent, wherein the determining is based on the indication of soft symbol availability being from one parent or more than one parent of the at least one parent; and means, based on the determining, for performing measures by the network device before applying indicated changes for a usage of the soft symbol at the network device.

In the example aspect of the disclosure according to the paragraph above, wherein at least the means for receiving, determining, and performing comprises one or more transceivers [TRANS 10D], a non-transitory computer readable medium [MEM 10B] encoded with a computer program [PROG 10C] executable by at least one processor [DP 10A and/or 10F].

In an example aspect of the disclosure, there is an apparatus, such as a network node or base station apparatus, comprising: at least one processor; and at least one memory including computer program code, where the at least one memory and the computer program code are configured, with the at least one processor, to cause the apparatus to at least: determine, by a network node of a communication network, information for a network device comprising a configuration for monitoring an indication of soft symbol availability from a communication network that uses at least one parent node to support the network device; and based on the determining, send the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent.

In another example aspect of the disclosure, there is a method comprising, determining, by a network node of a communication network, information for a network device comprising a configuration for monitoring an indication of soft symbol availability from a communication network that uses at least one parent node to support the network device; and based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent.

A further example embodiment is a method and apparatus comprising the method and apparatus of the previous paragraphs, wherein the measures comprise conflict resolution measures when the soft symbol availability is based on different soft symbol availability indications for more than one parent of the at least one parent, wherein the conflict resolution measures comprise transmission-reception points of the at least one parent are dynamically coordinated to perform conflict resolution measures when the soft symbol availability is based on different soft symbol availability indications for the more than one parent, wherein the conflict resolution measures comprise after one transmission-reception point provides downlink control information format and the network node performs the conflict resolution, there is sending towards the network device indication information of another transmission-reception point to identify the downlink control information format, wherein the indication information comprises an indication of a second transmission-reception point to identify whether future transmissions are one of canceled, rescheduled, wherein the second transmission-reception point is providing downlink control information format from a second transmission-reception point such that the network device can use the soft resources, wherein based on the network node being capable of conflict resolution measures, the network device does not expect any conflicting soft symbol availability indication to be received within a same slot from the downlink control information format, wherein a configuration for monitoring the indication of soft symbol availability is linked to search spaces that downlink control information format indicates for the soft symbol availability, wherein the more than one parent comprise more than one transmission-reception point with more than one control resource set divided among different transmission-reception points using control resource set pool index value, wherein the dividing comprises search spaces that downlink control information format indicating the soft resource availability are associated with more than one transmission-reception point, wherein the measures for a soft symbol availability indication that is for one parent, comprises: applying at the network device a predefined time offset prior for applying soft symbol availability indication based on the soft symbol availability indication by the one parent, wherein the indication information comprises an indication of a second transmission-reception point to identify whether future transmissions using conflicting resources are one of canceled, or rescheduled, wherein the pre-defined time offset is based on estimations of backhaul latency and coordination delays, wherein the indication of the second transmission-reception point is after a downlink control information format is sent, such that second transmission-reception point can identify to one of cancel or reschedule traffic to the network device, wherein a configuration for monitoring the indication of soft symbol availability is linked to a search space associated with one transmission-reception point that downlink control information format indicates for the soft symbol availability, and wherein the indication of soft symbol availability being from one parent or more than one parent is determined based on a search space association towards at least one control resource set and a use at each parent of the at least one control resource set.

One or more transceivers (TRANS 12D of FIG. 2), a non-transitory computer-readable medium (MEM 12B of FIG. 2) storing program code (PROG 12C of FIG. 2), the program code executed by at least one processor (DP 12A of FIG. 2) to perform the operations as at least described in the paragraphs above.

In accordance with an example embodiment of the disclosure as described above there is an apparatus comprising: means for determining, by a network node of a communication network, information for a network device comprising a configuration for monitoring an indication of soft symbol availability from a communication network that uses at least one parent node to support the network device; and based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent.

In the example aspect of the disclosure according to the paragraph above, wherein at least the means for determining and sending comprises one or more transceivers (TRANS 12D), a non-transitory computer readable medium (MEM 12B as in FIG. 2) encoded with a computer program (PROG 12C as in FIG. 2) executable by at least one processor (DP 12A as in FIG. 2).

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3 shows a table showing soft resource availability when different combinations of DCI 2-5 are received at the IAB-MT;

FIG. 4 shows mappings between different values of resource Availability elements and types of soft symbol availability in a slot;

FIG. 5A and FIG. 5B a method in accordance with example embodiments of the disclosure which may be performed by an apparatus.

DETAILED DESCRIPTION

In this disclosure, there is proposed a novel method for an IAB-MT that operates in multi-DCI based multi-TRP operation where a soft resource availability indication at the IAB DU is applied based on novel approaches.

Figure 1A:
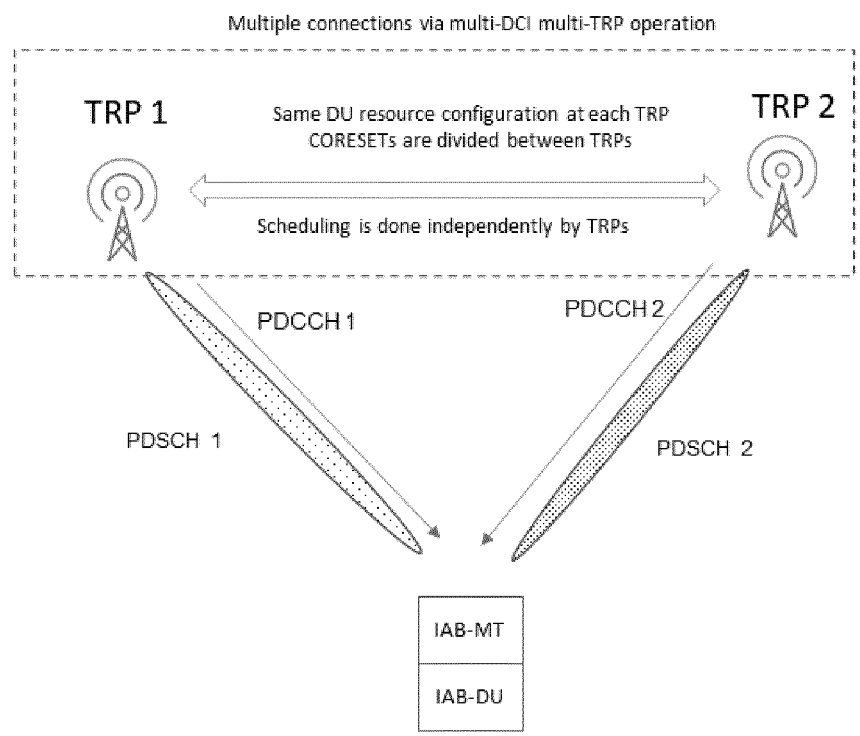
FIG. 1A shows Multi-TRP operation based on multi-connectivity for IAB-MT using a multi-DCI approach.
Figure 1B:
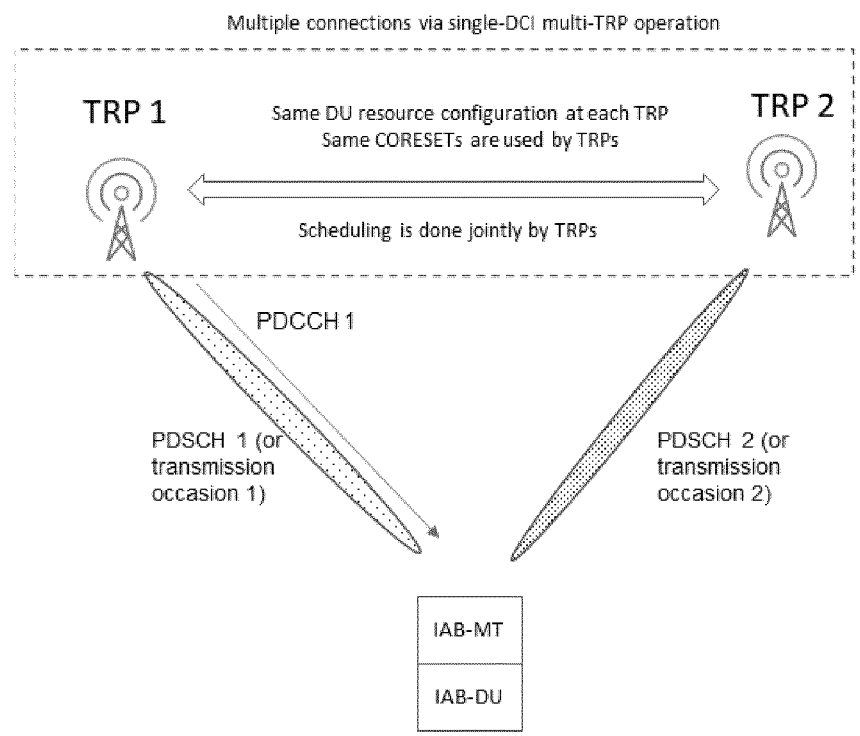
FIG. 1B shows Multi-TRP operation based on multi-connectivity for IAB-MT using a single DCI approach.

When the IAB MT supports multi-TRP operation, the IAB MT may be scheduled by two different TRPs and Rel-16 defined multi-TRP framework considering both single DCI based multi-TRP and multi-DCI based multi-TRP operations. The single DCI multi-TRP scheme is mainly using for the situation where coordination between TRPs are ideal (near ideal) and multi-DCI based multi-TRP operation is defined also addressing the case of non-ideal coordination scenarios (there is no restriction on using that also in ideal scenarios). However, the multiple TRPs that involved here are considered to be within the same DU, for example, can be regarded as to have single D/U/F and H/NA/S resources at both TRPs. FIG. 1A and FIG. 1B each show a possible connection towards the IAB-MT via the multi-TRP framework. Where for the single resources D is indicating Downlink, U is indicating uplink, F is indicating flexible resources, H is indicating hard, NA is indicating not available, and S is indicating soft.

FIG. 1A shows Multi-TRP operation based on multi-connectivity for IAB-MT using a multi-DCI approach. As shown in FIG. 1A there are multiple connections via multi-DCI multi-TRP operation. As shown in FIG. 1A the same DU resource configuration at each TRP CORESET's are divided between TRPs, and the scheduling is done independently by the TRPs.

FIG. 1B shows Multi-TRP operation based on multi-connectivity for IAB-MT using a single DCI approach. As shown in FIG. 1B there are multiple connections via single-DCI multi-TRP operation. As shown in FIG. 1A the same DU resource configuration at each TRP and same CORESET's are used by TRPs, and the scheduling is done jointly by TRPs.

The dynamic coordination in single DCI based multi-TRP may be compatible with Rel-16 IAB availability indication mechanism, mainly due to one DCI schedules transmission from two TRPs. However, the problem comes when indicating IAB-DU soft resource availability in multi-DCI based multi-TRP operation. Multi-DCI framework allows each TRP to send DCI independently and child node (IAB node in FIG. 1a). In one example, IAB node will be in trouble if the DCI 2_5 is sent by TRP1 and IAB DU reacts accordingly but the other TRP (TRP2) still scheduling the same resources to IAB-MT such that use of soft resources at IAB DU collides with that. Example embodiments of the disclosure address these kind of issues when the IAB MT operates in multi-DCI based multi-TRP operation.

Example embodiments of the disclosure relate to an IAB-MT that operates in multi-DCI based multi-TRP operation, the soft resource availability indication at the IAB DU is applied based on the following approaches.

Figure 2:
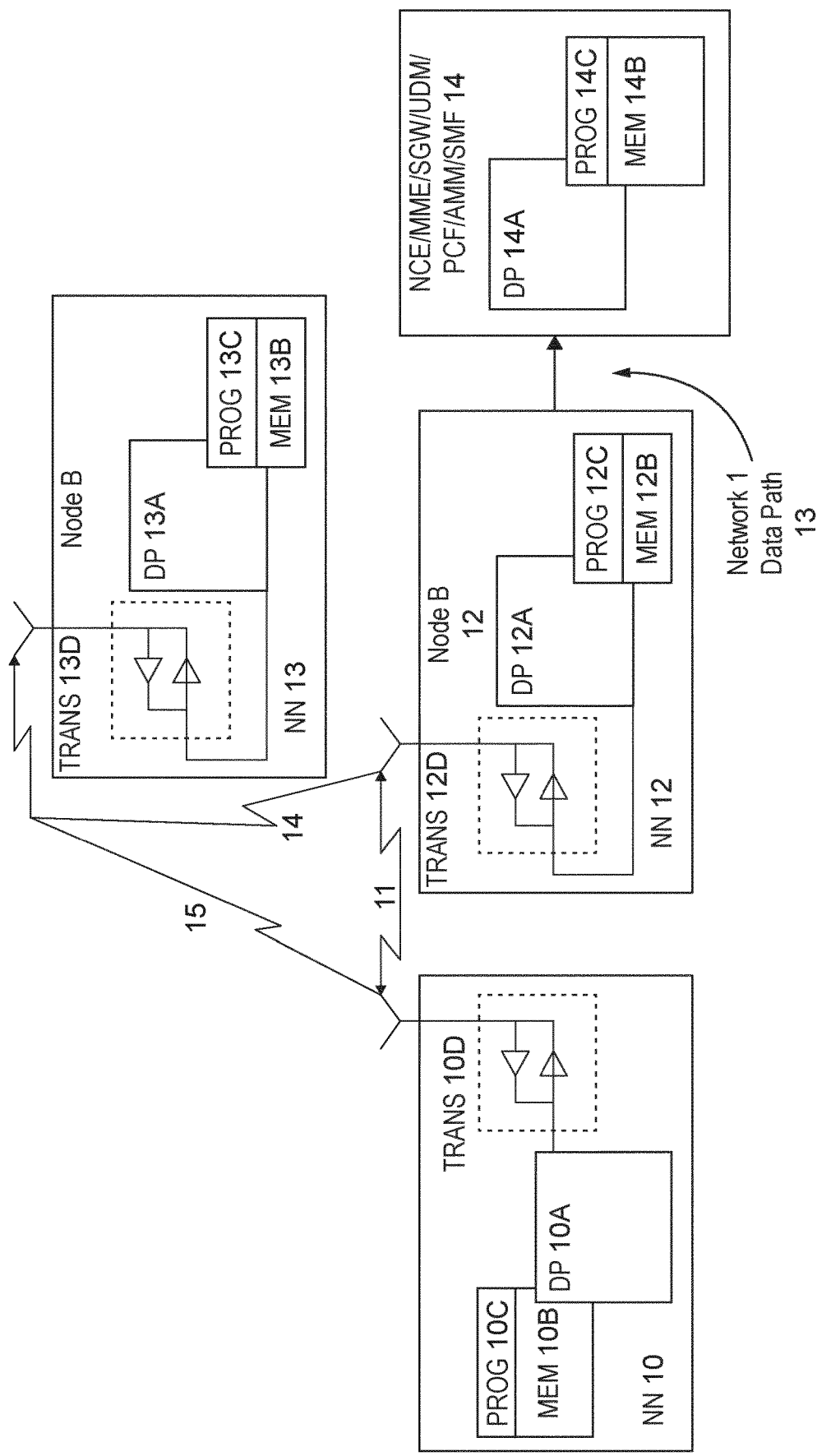
FIG. 2 shows a high level block diagram of various devices used in carrying out various aspects of the disclosure.

Before describing the example embodiments of the disclosure in detail, reference is made to FIG. 2 for illustrating a simplified block diagram of various electronic devices that are suitable for use in practicing the example embodiments of this disclosure.

FIG. 2 shows a block diagram of one possible and non-limiting exemplary system in which the example embodiments of the disclosure may be practiced. In FIG. 2, a network node (NN) 10 which can be any device such as a user equipment or (UE) is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The NN 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 14 to NN 12 and NN 13, respectively. The one or more memories MEM 10B include computer program code PROG 10C. The NN 10 communicates with NN 12 and/or NN 13 via a wireless link 11 or a wireless link 15, respectively.

The NN 12 (NR/5G Node B, an evolved NB, or LTE device) is a network node such as a master or secondary node base station (e.g., for NR or LTE long term evolution) that communicates with devices such as NN 13 and NN 10 of FIG. 2. The NN 12 provides access to wireless devices such as the NN 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the disclosure. Each of the one or more transceivers TRANS 12D includes a receiver and a transmitter. The one or more transceivers TRANS 12D are connected to one or more antennas for communication over at least link 11 with the NN 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW//AMF/UPF device such as the NCE/MME/SGW/UDM/PCF/AMM/SMF 14 of FIG. 2. The NN 12 may perform functionalities of an MME (Mobility Management Entity) or SGW (Serving Gateway), such as a User Plane Functionality, and/or an Access Management functionality for LTE and similar functionality for 5G The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or NN 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the disclosure. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as for example the NN 12 via link 14. The NN 13 may communicate with the NN 10 via for example link 15 or another link. As stated above the NN 12 may communicate with the NN 10 via link 11, or vice versa. It is noted that any disclosure in this application of a particular application of these links 11, 14, or 15 is not limiting, and any of these links can be seen to be interconnected or using a same medium.

Further, these links may be wired or wireless or both and may implement, e.g., an X2 or Xn interface. Further, as stated above the link 11, 14, and/or 15 may be through other network devices such as, but not limited to an NCE/MME/SGW device such as the NCE/MME/SGW/UDM/PCF/AMM/SMF 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses of the device of FIG. 2 could be implemented in part as fiber optic cable to connect the other elements of the NN 12 to a RRH.

It is noted that although FIG. 2 shows a network node such as NN 12 and/or NN 13. Any of these nodes may can incorporate or be incorporated into an eNodeB or eNB or gNB such as for LTE and NR, and would still be configurable to perform example embodiments of the disclosure.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the disclosure in any of an LTE, NR, 5G and/or any standards based communication technologies being performed or discussed at the time of this application. In addition, it is noted that the operations in accordance with example embodiments of the disclosure, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses of a data path 13 which can be coupled with the link 11 and/or 14 and/or 15. In accordance with the example embodiments these network interfaces can include X2 and/or Xn interfaces for use to perform the example embodiments of the disclosure. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the disclosure.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the NN 10, NN 12, NN 13, and other functions as described herein.

As similarly stated above example embodiments of the disclosure relate to an IAB-MT that operates in multi-DCI based multi-TRP operation, the soft resource availability indication at the IAB DU is applied based on the at least the following approaches in accordance with example embodiments of the disclosure.

Method 1
1. Here, the search spaces that allow monitoring of DCI format 2-5 associated with CORESETs which are linked with the first and second TRP. In other words, DCI format 2_5 can be sent towards the IAB-MT using the CORESETs with a first CORESETPoolIndex value and CORESETs with a second CORESETPoolIndex value.
2. The IAB MT may expect DCI format 2-5 from both TRPs and variants on conflicting indications can be as follows,
    a. In one variant, the indicated soft resource availability (for upcoming slots) from different TRPs shall be the same. In other words, TRPs are dynamically coordinating prior sending the DCI format 2-5 and ensure the availability indication to be the same.
    b. In another variant, there could be conflicting availability indications from each TRP. Here, each TRP is only focused on releasing/acquiring resources concerning their own link towards the IAB-MT.
3. For item 2 b) it is important to discuss handling conflicts (rules) coming from different DCI 2-5 from multiple TRPs. Here, *Handling conflicts at the IAB MT* described below will be applied.

4. The IAB MT does not expect any conflicting resource availability indication to be received within the same slot from the CORESETs that are associated with the same CORESETPoolIndex (same TRP). Here, Rel-16 IAB principle is used with the exception that it is applied within a CORESET-PoolIndex.

Handling Conflicts at the IAB MT

The IAB DU shall consider DCI 2-5 received from two different TRPs when deriving the availability indication for the soft resources.

FIG. 3 shows a table of soft resource availability when different combinations of DCI 2-5 are received at the IAB-MT. In summary, the resultant effect from each indication is used by the IAB DU.

Interpretations for the table of FIG. 3 include:
No Indication—No indication of availability for soft symbols;
X-S: Yes—X soft symbols are indicated available. Here, X can be DL, UL, or F; and
X-S: No—No indication of availability for X soft symbols. Here, X can be DL, UL, or F.

FIG. 4 shows a mapping between different values of resourceAvailability elements and types of soft symbol availability in a slot.

As shown in FIG. 4 there are mappings between resourceAvailability values 0-7 to indications.

Method 2
1. When the search spaces that allow monitoring of DCI format 2-5 associated only to CORESETs which are linked with a first TRP. In other words, DCI 2_5 may be sent only using the CORESETs with a first CORESETPoolIndex. The CORESETs associated with the second TRP (the second CORESETPoolIndex) may not have any search spaces that allows monitoring of DCI format 2-5;
2. The IAB MT does not expect any conflicting transmission from second TRP when the first TRP sends DCI format 2-5 indicating the availability of soft resources for the IAB DU In other words, TRPs are dynamically coordinating resource use prior to sending the DCI format 2-5 via the first TRP; and
3. When there is non-ideal BH between TRPs, a predefined time offset can be applied from the slot that DCI 2-5 is detected by the IAB-MT to the earliest slot that the IAB DU shall apply the availability indication. This predefine time offset may be fixed by the spec or configured to the IAB MT such that IAB DU waits a certain number of symbols/slots after reception of the DCI format 2-5 prior applying the indicated availability instructions.
   This time offset could be associated with the BH latency experienced by the coordinating TRPs;
   The time offset may be defined in terms of slots and/or symbols;
   In another variant, first TRP may send DCI 2-5 in slot n+x, where the coordination between TRPs may be already started in slot n. Here, first TRP may predict its resource usage for slot n+x (and beyond), where x could be the predefined time offset, but it is not configured to the IAB node;
   In another variant, the predefined time offset may be indicated using values of DCI 2-5, where the first TRP may send DCI 2-5 in slot n with x upcoming slots (and/or symbols. Time offset in terms of symbols apply if the value indicating only a specific resource type(s) is not available. E.g. indicating DL is not available, but other resources are available in a slot) are indicated not available (value 0 in FIG. 4). The IAB node then implicitly understand the predefined time offset, and start using soft resources according to the availability indication from slot n+x;
   In another variant, the IAB node may be configured with more than one predefined time offset where different resource types may apply different predefined time offsets. In one example, if the DCI 2-5 indicating two predefined time offsets a lower predefined time offset may be configured for the availability of DL soft resources while a larger predefined time offset may be configured for the availability of UL soft resources. In another example, if the DCI 2-5 indicating no resources are indicated available (Value 0) the predefined time offset equal to zero may be applied compared to the case where DCI 2-5 indicating other values.

Figure 6:
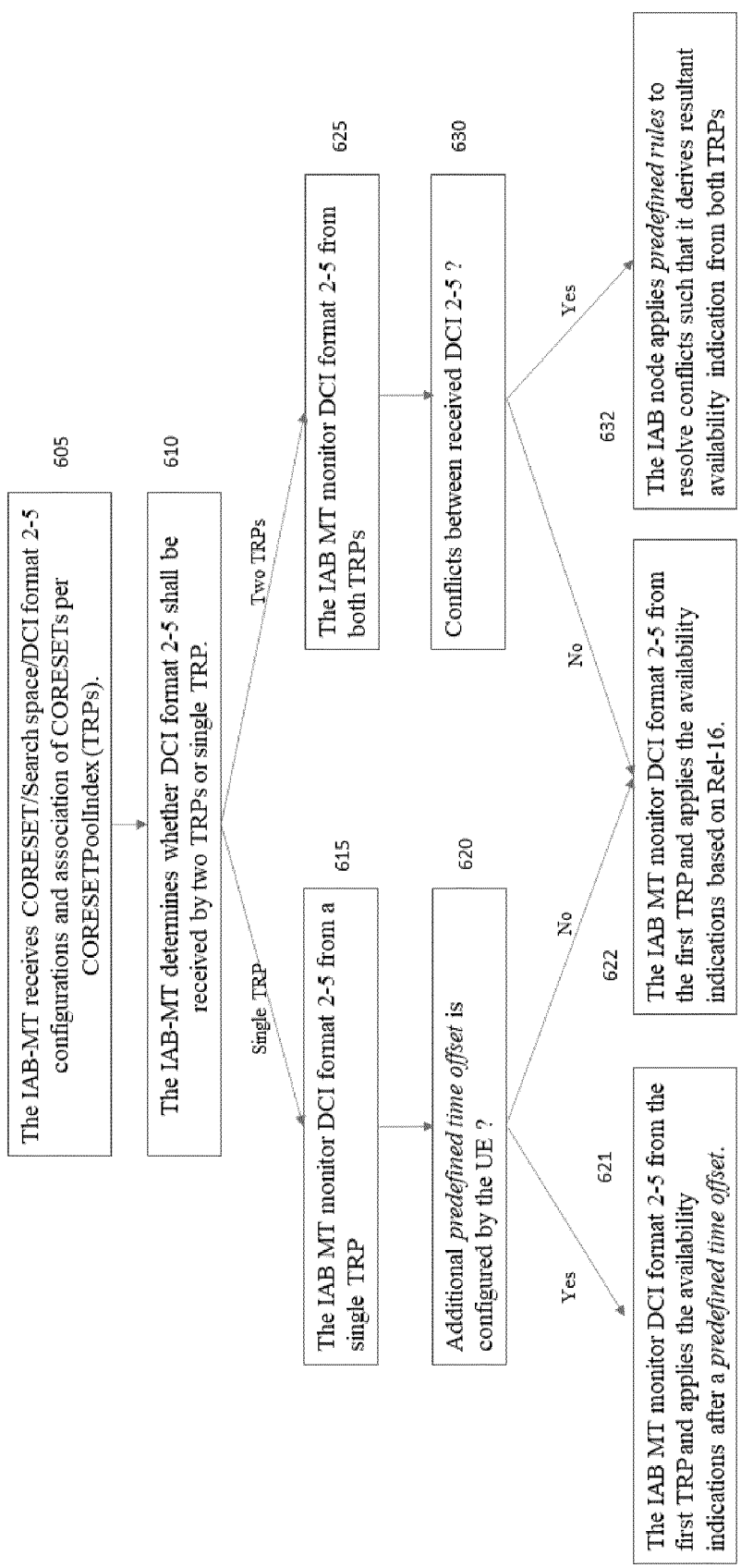
FIG. 6 shows IAB MT behaviour in accordance with example embodiments of the disclosure for handling DCI format 2-5 with the multi-TRP framework.

FIG. 6 shows IAB MT behaviour in accordance with example embodiments of the disclosure for handling DCI format 2-5 with the multi-TRP framework. In FIG. 6 there is provided summarized steps for the IAB-MT capturing both Method 1 and 2. The details of each step are discussed below.

As shown in step 605 of FIG. 6 the IAB-MT receives CORESET/Search Space/DCI format 2-5 configurations and association of CORESETs per CORESETPoolIndex (TRPs). Then as shown in step 610 of FIG. 6 the IAB-MT determines whether DCI format 2-5 shall be received by two TRPs or single TRP. For the case where the DCI format 2-5 is received by a single TRP, then as shown in step 615 of FIG. 6 the IAB MT monitors DCI format 2-5 from a single TRP. Then as shown in step 620 of FIG. 6 there is determining if an additional predefined time offset is configured by the UE. Then if 'yes' in one alternative as shown in step 621 of FIG. 6 the IAB MT monitors DCI format 2-5 from the first TRP and applies availability of soft resources after a predefined time offset. Or if 'no' then as shown in step 622 of FIG. 6 the IAB MT monitors DCI format 2-5 from first TRP and applies availability of soft resources based on standards Rel-16. For the case where the DCI format 2-5 is received by two TRP, then as shown in step 625 of FIG. 6 the IAB MT monitors DCI format 2-5 from both TRP. Then as shown in step 630 of FIG. 6 there is a determination of whether there are conflicts between received DCI 2-5. If 'yes' then as shown in step 632 the IAB node applies predefined rules to resolve conflicts such that it derives resultant availability indication for both TRPs. If 'no' then as shown in step 622 of FIG. 6 the IAB MT monitors DCI format 2-5 from first TRP and applies availability indications based on standards Rel-16.

Figure 5A:
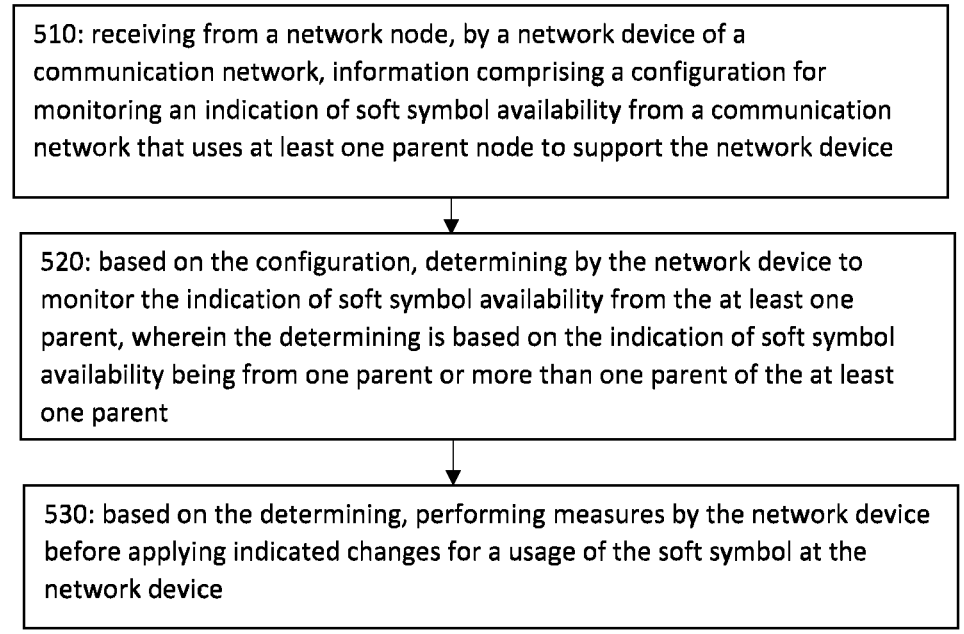

FIG. 5A illustrates operations which may be performed by a network device such as, but not limited to, a network node NN 10 as in FIG. 2 or a network device. As shown in step 510 of FIG. 5A there is receiving from a network node, by a network device of a communication network, information comprising a configuration for monitoring an indication of soft symbol availability from a communication network that uses at least one parent node to support the network device. As shown in step 520 of FIG. 5A there is, based on the configuration, determining by the network device to monitor the indication of soft symbol availability from the at least one parent, wherein the determining is based on the indication of soft symbol availability being from one parent or more than one parent of the at least one parent. Then as shown in step 530 of FIG. 5A there is, based on the determining, performing measures by the network device before applying indicated changes for a usage of the soft symbol at the network device.

In accordance with the example embodiments as described in the paragraph above, wherein the measures comprise conflict resolution measures when the soft symbol availability is based on different soft symbol availability indications for more than one parent of the at least one parent.

In accordance with the example embodiments as described in the paragraphs above, wherein a configuration for monitoring the indication of soft symbol availability is linked to search spaces that downlink control information format indicates for the soft symbol availability.

In accordance with the example embodiments as described in the paragraphs above, wherein based on the network node being capable of conflict resolution measures, the network device does not expect any conflicting soft symbol availability indication to be received within a same slot from the downlink control information format.

In accordance with the example embodiments as described in the paragraphs above, wherein the more than one parent comprise more than one transmission-reception point with more than one control resource set divided among different transmission reception points using control resource set pool index value.

In accordance with the example embodiments as described in the paragraphs above, wherein the information comprises an indication of soft symbol availability from different transmission-reception points of the more than one transmission-reception point.

In accordance with the example embodiments as described in the paragraphs above, wherein the indication of soft symbol availability from the different transmission-reception points are dynamically coordinated to be the same.

In accordance with the example embodiments as described in the paragraphs above, wherein the soft symbol availability is indicated independently by each transmission-reception point of the different transmission-reception points.

In accordance with the example embodiments as described in the paragraphs above, wherein indications of the soft symbol availability indicated using the downlink control information format comprises one of same indications or different indications received via the different transmission-reception points.

In accordance with the example embodiments as described in the paragraphs above, wherein when different indications received, the conflict resolution measures consider a rule that a given resource type is only available only if both parents provides soft symbol availability indications that allows to use a soft symbol at the network device.

In accordance with the example embodiments as described in the paragraphs above, the given resource type comprises at least one of downlink, uplink, or flexible resources at the distributed unit of the network device, and the availability of soft resources for each resource type follows a same principal.

In accordance with the example embodiments as described in the paragraphs above, wherein when different indications received, the conflict resolution measures consider a rule that a given resource type is available if at least one parent provides availability indicator, while a different resource type is not available unless both parents provides availability indicator.

In accordance with the example embodiments as described in the paragraphs above, wherein for a case the indication of soft symbol availability is from just one transmission-reception point, there is: the network device determining not to use this soft symbol availability for the applying for a given resource type of all resource types.

In accordance with the example embodiments as described in the paragraphs above, wherein the indication of soft symbol availability from the different transmission-reception points are dynamically pre-configured for the network device.

In accordance with the example embodiments as described in the paragraphs above, wherein the dividing comprises search spaces that DCI format indicating the soft resource availability are associated with more than one transmission-reception point.

In accordance with the example embodiments as described in the paragraphs above, wherein the measures for a soft symbol availability indication that is for one parent, comprises: using a pre-defined time offset prior to applying soft symbol availability indication based on the soft symbol availability indication by the one parent.

In accordance with the example embodiments as described in the paragraphs above, wherein the pre-defined time offset is received via the different transmission-reception points.

In accordance with the example embodiments as described in the paragraphs above, wherein based on receiving downlink control information format from a first transmission-reception point, there is: during the pre-defined time offset, the network device is only required to send uplink transmissions towards to a second transmission-reception point.

In accordance with the example embodiments as described in the paragraphs above, wherein a pre-defined time offset is defined for indication of the downlink control information format, wherein pre-defined time offset period is one of: interpreted to the network device by using first set of slot are indicated as not available using a value 0, or defined for indication value of the downlink control format, and wherein if all resources are indicated available using a value 7, then the pre-defined time period could be an X number of slots, or wherein if no resources are indicated as available using a value 0 a lower offset or 0 slots may be defined.

In accordance with the example embodiments as described in the paragraphs above, wherein if all resources are indicated as available, then the predefined time period comprises X slots, where X is an integer.

In accordance with the example embodiments as described in the paragraphs above, wherein if zero resources are indicated as available, then a lower offset of 0 slots is defined.

In accordance with the example embodiments as described in the paragraphs above, wherein a configuration for monitoring the indication of soft symbol availability is linked to a search space associated with one transmission-reception point that downlink control information format indicates for the soft symbol availability.

In accordance with the example embodiments as described in the paragraphs above, wherein the indication of soft symbol availability being from one parent or more than one parent is determined based on a search space association towards at least one control resource set (CORESET) and a use at each parent of the at least one control resource set.

In accordance with the example embodiments as described in the paragraphs above, wherein the indication of soft symbol availability applies for any combinations of downlink, uplink, and Flexible soft resource availabilities.

A non-transitory computer-readable medium (MEM 12B of FIG. 2) storing program code (PROG 10C of FIG. 2), the program code executed by at least one processor (DP 10A and/or DP 10F of FIG. 2) to perform the operations as at least described in the paragraphs above.

In accordance with an example embodiment of the disclosure as described above there is an apparatus comprising: means for receiving (TRANS 10D, DP 10A, DP 10F, PROG 10C, and/or MEM 10B of FIG. 2) from a network node (NN 12 as in FIG. 2), by a network device (NN 10 as in FIG. 2) of a communication network (Network 1 as in FIG. 2), information comprising a configuration for monitoring (TRANS 10D, DP 10A, DP 10F, PROG 10C, and/or MEM 10B of FIG. 2) an indication of soft symbol availability from a communication network that uses at least one parent node to support the network device; means, based on the configuration, for determining (TRANS 10D, DP 10A, DP 10F, PROG 10C, and/or MEM 10B of FIG. 2) by the network device to monitor the indication of soft symbol availability from the at least one parent, wherein the determining is based on the indication of soft symbol availability being from one parent or more than one parent of the at least one parent; and means, based on the determining, for performing (TRANS 10D, DP 10A, DP 10F, PROG 10C, and/or MEM 10B of FIG. 2) measures by the network device before applying indicated changes for a usage of the soft symbol at the network device.

In the example aspect of the disclosure according to the paragraph above, wherein at least the means for receiving, determining, and performing comprises one or more transceivers [TRANS 10D], a non-transitory computer readable medium [MEM 10B] encoded with a computer program [PROG 10C] executable by at least one processor [DP 10A and/or 10F].

FIG. 5B illustrates operations which may be performed by a network device such as, but not limited to, a network node NN 12 as in FIG. 2 or an eNB. As shown in step 550 of FIG. 5A there is determining, by a network node of a communication network, information for a network device comprising a configuration for monitoring an indication of soft symbol availability from a communication network that uses at least one parent node to support the network device. Then as shown in step 560 of FIG. 5B there is, based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent.

In accordance with the example embodiments as described in the paragraph above, wherein the measures comprise conflict resolution measures when the soft symbol availability is based on different soft symbol availability indications for more than one parent of the at least one parent.

In accordance with the example embodiments as described in the paragraphs above, wherein the conflict resolution measures comprise transmission-reception points of the at least one parent are dynamically coordinated to perform conflict resolution measures when the soft symbol availability is based on different soft symbol availability indications for the more than one parent.

In accordance with the example embodiments as described in the paragraphs above, wherein the conflict resolution measures comprise after one transmission-reception point provides downlink control information format and the network node performs the conflict resolution, there is sending towards the network device indication information of another transmission-reception point to identify the downlink control information format.

In accordance with the example embodiments as described in the paragraphs above, wherein the indication information comprises an indication of a second transmission-reception point to identify whether future transmissions are one of canceled, rescheduled, wherein the second transmission-reception point is providing downlink control information format from a second transmission-reception point such that the network device can use the soft resources.

In accordance with the example embodiments as described in the paragraphs above, wherein based on the network node being capable of conflict resolution measures, the network device does not expect any conflicting soft symbol availability indication to be received within a same slot from the downlink control information format.

In accordance with the example embodiments as described in the paragraphs above, wherein a configuration for monitoring the indication of soft symbol availability is linked to search spaces that downlink control information format indicates for the soft symbol availability.

In accordance with the example embodiments as described in the paragraphs above, wherein the more than one parent comprise more than one transmission-reception point with more than one control resource set divided among different transmission-reception points using control resource set pool index value.

In accordance with the example embodiments as described in the paragraphs above, wherein the dividing comprises search spaces that downlink control information format indicating the soft resource availability are associated with more than one transmission-reception point.

In accordance with the example embodiments as described in the paragraphs above, wherein the measures for a soft symbol availability indication that is for one parent, comprises: applying at the network device a predefined time offset prior for applying soft symbol availability indication based on the soft symbol availability indication by the one parent.

In accordance with the example embodiments as described in the paragraphs above, wherein the indication information comprises an indication of a second transmission-reception point to identify whether future transmissions using conflicting resources are one of canceled, or rescheduled.

In accordance with the example embodiments as described in the paragraphs above, wherein the pre-defined time offset is based on estimations of backhaul latency and coordination delays.

In accordance with the example embodiments as described in the paragraphs above, wherein the indication of the second transmission-reception point is after a downlink control information format is sent, such that second transmission-reception point can identify to one of cancel or reschedule traffic to the network device.

In accordance with the example embodiments as described in the paragraphs above, wherein a configuration for monitoring the indication of soft symbol availability is linked to a search space associated with one transmission-reception point that downlink control information format indicates for the soft symbol availability.

In accordance with the example embodiments as described in the paragraphs above, wherein the indication of soft symbol availability being from one parent or more than one parent is determined based on a search space association towards at least one control resource set (CORESET) and a use at each parent of the at least one control resource set.

A non-transitory computer-readable medium (MEM 12B of FIG. 2) storing program code (PROG 12C of FIG. 2), the program code executed by at least one processor (DP 12A and/or DP 12F of FIG. 2) to perform the operations as at least described in the paragraphs above.

In accordance with an example embodiment of the disclosure as described above there is an apparatus comprising: means for determining (TRANS 12D, DP 12A, DP 12F, PROG 12C, and MEM 12B of FIG. 2), by a network node (NN12 as in FIG. 2) of a communication network (Network 1 as in FIG. 2), information for a network device (NN 10 as in FIG. 2) comprising a configuration for monitoring (TRANS 12D, DP 12A, DP 12F, PROG 12C, and MEM 12B of FIG. 2) an indication of soft symbol availability from a communication network that uses at least one parent node to support the network device; means, based on the determining, for sending (TRANS 12D, DP 12A, DP 12F, PROG 12C, and MEM 12B of FIG. 2) the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent In the example aspect of the disclosure according to the paragraph above, wherein at least the means for determining and sending comprises one or more transceivers [TRANS 12D], a non-transitory computer readable medium [MEM 12B] encoded with a computer program [PROG 12C] executable by at least one processor [DP 12A and/or 12F].

It is noted that one main advantage of operations in accordance with example embodiments of the disclosure is that it used multi-TRP framework without adding complicated rules for smooth operation at the IAB nodes.

Further, in accordance with example embodiments of the disclosure there is circuitry for performing operations in accordance with example embodiments of the disclosure herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the disclosure as described herein.

In accordance with example embodiments of the disclosure as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the disclosure as disclosed herein); and
(c) hardware circuit(s) and or processor(s), such as a microprocessor(s) or a portion of a microprocessor(s) that requires software (e.g., firmware) for operation, but the software may not be present when it is not needed for operation."

In accordance with example embodiments of the disclosure, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the disclosure and not to limit the scope of the disclosure of invention which is defined by the claims.

The foregoing description has provided by way of exemplary and non-limiting examples a full and informative description of the best method and apparatus presently contemplated by the inventors for carrying out the disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this disclosure of invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this disclosure could be used to advantage without the corresponding use of other features. As such, the foregoing description should be considered as merely illustrative of the principles of the disclosure, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   receive from a network node, by a network device of a communication network, information comprising a configuration for monitoring an indication of soft symbol availability from the communication network that uses at least one parent node to support the network device;
   based on the configuration, determine by the network device to monitor the indication of soft symbol availability from the at least one parent, wherein the determining is based on the indication of soft symbol availability being from one parent or more than one parent; and
   based on the determining, perform measures by the network device before applying indicated changes for a usage of the soft symbol at the network device,
   wherein the measures comprise conflict resolution measures when the soft symbol availability is based on different soft symbol availability indications for more than one parent,
   wherein when different indications are received, the conflict resolution measures consider a rule that a given resource type is only available only if all of the more than one parent provide soft symbol availability indications that allows to use a soft symbol at the network device.

2. The apparatus of claim 1, wherein a configuration for monitoring the indication of soft symbol availability is linked to search spaces that downlink control information format indicates for the soft symbol availability.

3. The apparatus of claim 2, wherein based on the network node being capable of conflict resolution measures, the network device does not expect any conflicting soft symbol availability indication to be received within a same slot from the downlink control information format.

4. The apparatus of claim 2, wherein indications of the soft symbol availability indicated using the downlink control information format comprises one of same indications or different indications received via different transmission-reception points.

5. The apparatus of claim 1, wherein the more than one parent comprise more than one transmission-reception point with more than one control resource set divided among different transmission reception points using control resource set pool index value.

6. The apparatus of claim 5, wherein the information comprises an indication of soft symbol availability from different transmission-reception points of the more than one transmission-reception point.

7. The apparatus of claim 6, wherein the indication of soft symbol availability from the different transmission-reception points are dynamically coordinated to be the same.

8. The apparatus of claim 6, wherein the soft symbol availability is indicated independently by each transmission-reception point of the different transmission-reception points.

9. The apparatus of claim 5, wherein the dividing comprises search spaces with a downlink control information format indicating the soft resource availability are associated with more than one transmission-reception point.

10. The apparatus of claim 1, wherein the given resource type comprises at least one of downlink, uplink, or flexible resources at the distributed unit of the network device, and the availability of soft resources for each resource type follows a same principal.

11. The apparatus of claim 1, wherein when different indications are received, the conflict resolution measures consider a rule that a given resource type is available if at least one parent provides availability indicator, while a different resource type is not available unless both all of the more than one parents provide availability indicator.

12. The apparatus of claim 1, wherein for a case the indication of soft symbol availability is from just one transmission-reception point, wherein the network device is determining not to use this soft symbol availability for the applying for a given resource type of all resource types.

13. The apparatus of claim 1, wherein the measures for a soft symbol availability indication that is for one parent, comprises: using a pre-defined time offset prior to applying soft symbol availability indication based on the soft symbol availability indication by the one parent.

14. The apparatus of claim 1, wherein the indication of soft symbol availability applies for any combinations of downlink, uplink, and flexible soft resource availabilities.

15. A method, comprising,
   determining, by a network node of a communication network, information for a network device comprising a configuration for monitoring an indication of soft symbol availability from the communication network that uses at least one parent node to support the network device; and based on the determining, sending the information towards the network device, wherein the information is to cause network device to perform measures comprising monitoring the indication of soft symbol availability from the at least one parent and applying indicated changes for a usage of the soft symbol based on the indication of soft symbol availability being from one parent or more than one parent, wherein the measures comprise conflict resolution measures when the soft symbol availability is based on different soft symbol availability indications for more than one parent wherein when different indications are received, the conflict resolution measures consider a rule that a given resource type is only available only if all of the more than one parent provide soft symbol availability indications that allow to use a soft symbol at the network device.

16. The method of claim 15, wherein a configuration for monitoring the indication of soft symbol availability is linked to search spaces that downlink control information format indicates for the soft symbol availability.

17. The method of claim 15, wherein the given resource type comprises at least one of downlink, uplink, or flexible resources at the distributed unit of the network device, and the availability of soft resources for each resource type follows a same principal.

18. The method of claim 15, wherein when different indications are received, the conflict resolution measures consider a rule that a given resource type is available if at least one parent provides availability indicator, while a different resource type is not available unless all of the more than one parent provide availability indicator.

19. The method of claim 15, wherein the indication of soft symbol availability applies for any combinations of downlink, uplink, and flexible soft resource availabilities.

20. An apparatus comprising:

at least one processor; and at least one memory including computer program code, where the at least one memory and the computer program code are configured, with the at least one processor, to cause the apparatus to at least:

determine, by a network node of a communication network, information for a network device comprising a configuration for monitoring an indication of soft symbol availability from the communication network that uses at least one parent node to support the network device; and based on the determining, send the information towards the network device, wherein the information is to cause network device to perform measures comprising monitoring the indication of soft symbol availability from the at least one parent and apply indicated changes for a usage of the soft symbol based on the indication of soft symbol availability being from one parent or more than one parent, wherein the measures comprise conflict resolution measures when the soft symbol availability is based on different soft symbol availability indications for more than one parent, wherein when different indications are received, the conflict resolution measures consider a rule that a given resource type is only available only if all of the more than one parent provide soft symbol availability indications that allows to use a soft symbol at the network device.

* * * * *